United States Patent
Akutsu et al.

(10) Patent No.: US 10,359,967 B2
(45) Date of Patent: Jul. 23, 2019

(54) COMPUTER SYSTEM

(71) Applicant: HITACHI, LTD., Tokyo (JP)

(72) Inventors: Hiroaki Akutsu, Tokyo (JP); Akira Yamamoto, Tokyo (JP); Takahiro Yamamoto, Tokyo (JP); Yoshinori Ohira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/754,179

(22) PCT Filed: Aug. 10, 2016

(86) PCT No.: PCT/JP2016/073600
§ 371 (c)(1),
(2) Date: Feb. 21, 2018

(87) PCT Pub. No.: WO2018/029820
PCT Pub. Date: Feb. 15, 2018

(65) Prior Publication Data
US 2018/0285016 A1    Oct. 4, 2018

(51) Int. Cl.
*G06F 9/455* (2018.01)
*G06F 3/06* (2006.01)
(Continued)

(52) U.S. Cl.
CPC .............. *G06F 3/0647* (2013.01); *G06F 3/06* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 8,601,473 B1    12/2013  Aron et al.
9,807,170 B2 *  10/2017  Kaneko ............... H04L 67/1097
(Continued)

FOREIGN PATENT DOCUMENTS

| JP | 2007-328734 A | 12/2007 |
|----|---------------|---------|
| JP | 2014-178827 A | 9/2014  |
| JP | 2015-505078 A | 2/2015  |

OTHER PUBLICATIONS

International Search Report and Written Opinion for PCT/JP2016/073600 in Japanese Language.

*Primary Examiner* — Brian R Peugh
(74) *Attorney, Agent, or Firm* — Volpe and Koenig, P.C.

(57) ABSTRACT

A computer system includes a plurality of computer nodes communicating with each other via a network. Each of the plurality of computer nodes includes a local storage and at least one virtual machine. Each of the plurality of computer nodes transfers write data for the local storage to at least one different computer node for redundancy. A computer included in the computer system is configured to: obtain information indicating a write load amount of a first virtual machine; obtain information indicating remaining writable space of a local storage of a destination computer node among the plurality of computer nodes; and determine whether or not the first virtual machine should be transferred to the destination computer node, based on the write load amount of the first virtual machine and the remaining writable space of the destination computer node.

14 Claims, 14 Drawing Sheets

(51) Int. Cl.
 *G06F 3/08* (2006.01)
 *G06F 9/50* (2006.01)

(52) U.S. Cl.
 CPC .......... *G06F 3/0653* (2013.01); *G06F 3/0659* (2013.01); *G06F 3/0664* (2013.01); *G06F 3/08* (2013.01); *G06F 9/50* (2013.01); *G06F 9/45533* (2013.01)

(56) References Cited

U.S. PATENT DOCUMENTS

| | | |
|---|---|---|
| 2007/0288712 A1 | 12/2007 | Zimoto et al. |
| 2012/0272237 A1* | 10/2012 | Baron ................ G06F 9/45558 718/1 |
| 2013/0205070 A1 | 8/2013 | Koseki et al. |
| 2016/0062851 A1* | 3/2016 | Sugabrahmam .... G06F 11/1471 714/19 |

* cited by examiner

| 311 | 312 | 313 | 314 | 315 |
|---|---|---|---|---|
| STRIPE TYPE # | CORRESPONDING NODE #(1) | CORRESPONDING NODE #(2) | CORRESPONDING NODE #(3) | CORRESPONDING NODE #(4) |
| | | | | |
| | | | | |
| | | | | |
| | | | | |

STRIPE MAPPING TABLE 301

*FIG.4A*

| 321 | 322 | 323 | 324 | 325 |
|---|---|---|---|---|
| VM# | WRITE LOAD AMOUNT | VIRTUAL VOLUME CAPACITY | CAPACITY USED | TEMPLATE INFORMATION |
| | | | | |
| | | | | |
| | | | | |
| | | | | |

VM INFORMATION TABLE 302

*FIG.4B*

| 331 | 332 | 333 | 334 | 335 |
|---|---|---|---|---|
| DRIVE # | REMAINING WRITABLE SPACE | OPERATION TIME | LIFE CONSUMPTION RATE | WA MODEL |
| | | | | |
| | | | | |
| | | | | |
| | | | | |

STORAGE DRIVE LIFE INFORMATION TABLE 303

*FIG.4C*

| DRIVE # / 341 | REMAINING CAPACITY / 342 | PHYSICAL CAPACITY / 343 | LOGICAL CAPACITY / 344 | COMPRESSION RATE / 345 |
|---|---|---|---|---|
| | | | | |
| | | | | |
| | | | | |
| | | | | |

CAPACITY MANAGEMENT TABLE ～ 304

*FIG. 4D*

| HASH VALUE | TRANSFER INFORMATION | NODE#(1) | VOL #(1) | PAGE # (1) | NODE# (2) | VOL #(2) | PAGE # (2) | ... | BUFFER ADDRESS | DRIVE# | PAGE# |
|---|---|---|---|---|---|---|---|---|---|---|---|
| 351 | 352 | 353 | 354 | 355 | 356 | 357 | 358 | | 359 | 360 | 361 |
| | | | | | | | | | | | |
| | | | | | | | | | | | |
| | | | | | | | | | | | |
| | | | | | | | | | | | |

PAGE MAPPING TABLE — 305

FIG. 4E

COMPUTER SYSTEM

BACKGROUND

The present invention relates to a computer system.

An increased demand for the SoE (system of engagement) IT structure requires an IT structure to have agility, scalability, and high cost effectiveness.

For example, a hyper-converged system can start from a small-scale server structure, and can be expanded to a large-scale server. For this reason, the hyper-converged system is increasing its market share as a product targeted for the private cloud. A hyper-converged system includes a plurality of server nodes each of which has a local storage. Each server node has a virtualization function and storage function, and duplicates data by communicating with each other via a network U.S. Pat. No. 8,601,473 discloses an example of the hyper-converged system. The following is disclosed in U.S. Pat. No. 8,601,473, for example. "Disclosed is an improved approach to implement I/O and storage device management in a virtualization environment. According to some approaches, a Service VM is employed to control and manage any type of storage device, including directly attached storage in addition to networked and cloud storage. The Service VM implements the Storage Controller logic in the user space, and can be migrated as needed from one node to another. IP-based requests are used to send I/O request to the Service VMs. The Service VM can directly implement storage and I/O optimizations within the direct data access path, without the need for add-on products." (Abstract)

On the other hand, due to a strong demand for IoT and data analysis, a system using a flash drive has a greater share in the market. A flash drive has a life that depends on the number of times data was written. As a greater number of flash drives have multi-cells to achieve a larger capacity and lower price, the allowable number of writing has been reduced.

SUMMARY

A conventional computer system in which a plurality of computer nodes having the virtualization function communicate with each other via a network does not take into account the life of a storage drive used in that system, for example.

This means that the life of a storage drive of a certain computer node can be shortened due to uneven write loads among the computer nodes or writing of duplicate data performed by an application program or a storage controller program operating in the computer system.

An aspect of the present invention is a computer system including a plurality of computer nodes communicating with each other via a network. Each of the plurality of computer nodes includes a local storage and at least one virtual machine. Each of the plurality of computer nodes transfers write data for the local storage to at least one different computer node for redundancy. A computer included in the computer system is configured to: obtain information indicating a write load amount of a first virtual machine; obtain information indicating remaining writable space of a local storage of a destination computer node among the plurality of computer nodes; and determine whether or not the first virtual machine should be transferred to the destination computer node, based on the write load amount of the first virtual machine and the remaining writable space of the destination computer node.

According to an embodiment of the present invention, it is possible to extend the life of a storage drive of a computer node efficiently in a computer system in which a plurality of computer nodes having the virtualization function communicate with each other via a network.

BRIEF DESCRIPTION OF DRAWINGS

FIG. 4A shows a configuration example of the stripe mapping table.

FIG. 4B shows a configuration example of the VM information table.

FIG. 4C shows a configuration example of the storage drive life information table.

FIG. 4D shows a configuration example of the capacity management table.

FIG. 4E shows a configuration example of the page mapping table.

DETAILED DESCRIPTION OF EMBODIMENTS

Figure 1:
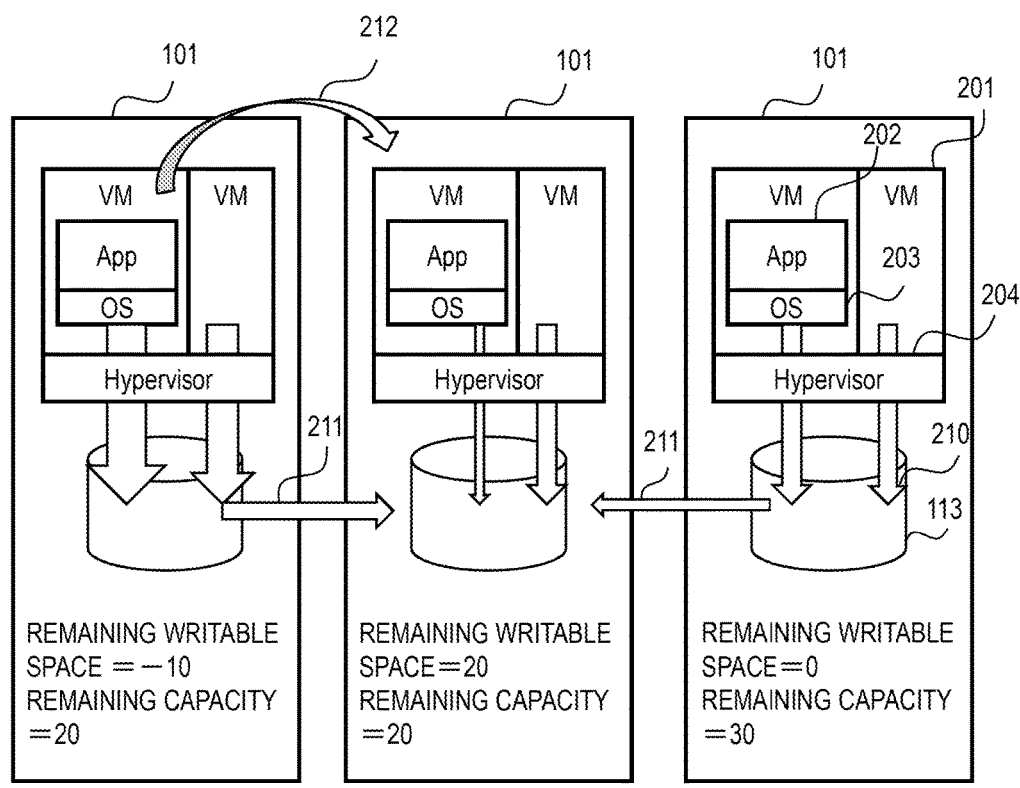
FIG. 1 shows an overview of the computer system of an embodiment.

Below, an embodiment of the present invention will be explained in detail with reference to the appended figures. This embodiment of the present invention is a mere example to implement the present invention, and shall not be interpreted to limit the technical scope of the present invention. In the respective figures, the same configurations are given the same reference characters.

FIG. 1 shows an overview of the computer system of this embodiment. The computer system includes a plurality of computer nodes 101 communicating with each other via a network. FIG. 1 shows three computer nodes 101, for example.

Each computer node 101 performs a hypervisor 204 to operate a virtual machine (VM) 201. Each computer node 101 also performs a network I/O program so that respective VMs 201 can communicate with each other, and a storage control program (storage I/O program described later, for example) that makes a local storage a scale-out storage.

The VM 201 is a virtual computer constituted of the hypervisor 204. The VM 201 performs OS (guest OS) 203 and an application program 202 on the hypervisor 204. Those programs for writing data into the local drive 113 are services operating in the computer node 101. Other virtualization techniques (such as the container technology) than the hypervisor 204 may be applied to the computer node. In the container technology, a container is used instead of a VM.

Each computer node 101 includes one or a plurality of storage drives 113. The storage drive 113 has a life determined by the write volume. A processor receives the information regarding the remaining writable space from the storage drive 113. The remaining writable space is a remaining writable volume for external data writing. The remaining writable space is represented by the data amount per unit time (write through-put) or the number of times data can be written per unit time (write IOPS), for example.

The writable space is determined using the existing techniques. For example, the writable space is defined in the storage drive 113 in advance. For example, the writable space is a value obtained by dividing the prescribed total writable space by a prescribed life of the product. The total writable space is represented in the form of data amount or IO number, for example. The total writable space is determined taking into consideration the process to write data into a medium performed by the internal processing including ware levelling.

The storage drive 113 calculates the remaining writable space, which is a difference between the writable space and the current write amount of data written from the outside. The current write amount includes data 210 written from the local VM 201 and data 211 written from other computer nodes 101. The storage drive 113 may correct the current write amount (external write amount) by the write amount from the actual internal processing including wear levelling. For example, the current write amount is corrected based on the comparison result between the ratio of the current external write amount to the current internal write amount and a predetermined value.

If the remaining writable space shows a negative value, it is necessary to reduce the current write load in order to achieve the designed product life. If the remaining writable space shows a positive value, the product life can be achieved even if the write load is increased for the excess amount.

The processor may calculate the remaining writable space from the information regarding the life, which is received from the storage drive 113. The processor obtains the operation time and the life consumption rate of the storage drive 113. The life consumption rate represents the ratio of the consumed life out of 100% life, and is determined based on the number of times data can be written in the medium and the actual number of times data has been written, for example.

The processor determines the relationship between the write amount (IOPS or through-put, for example) and the change rate of the life consumption rate, based on the operation time, the life consumption rate, and the total write amount within the operation time (IO number or data amount, for example). The processor calculates the change rate of the life consumption rate that meets the designed life from the current point based on the operation time and the life consumption rate, and determines the writable space based on the relationship between the change rate of the designed life consumption rate and the change rate of the actual life consumption rate.

The processor (computer node 101) stores the remaining writable space of each storage drive 113 in the memory or in the storage drive 113. Each computer node 101 also manages the remaining capacity of each storage drive 113.

When the processor detects the remaining writable space showing a negative value in one storage drive 113, the processor refers to the write amount of the VMs 201 that operate in the computer node 101 and that access the storage drive 113, and selects a VM that needs to be transferred to a different computer node 101.

In determining the destination of the VM, the processor takes into consideration the data amount 211 written by the storage control program (and the application program 202) for redundancy, in addition to the data amount 210 of the VM to be transferred. The storage control program sends out the write data for the local drive to at least one different computer node 101. When the VM 201 is transferred to a different computer node 101, the computer node 101 that has stored therein the duplicate data of the VM 201 changes. In the descriptions below, transferring data for redundancy is referred to as mirroring, and the data to be transferred may be referred to as mirror data.

The processor selects the destination computer node 101 so that not only the destination computer node 101, but also the computer node 101 that has stored therein the duplicate data for the destination computer node 101 maintain a positive value for the remaining writable space. In order to transfer a VM 201, the processor performs a data transfer process on the storage side at the same time as the live migration so that the data is stored in the local storage of the destination.

Figure 2:
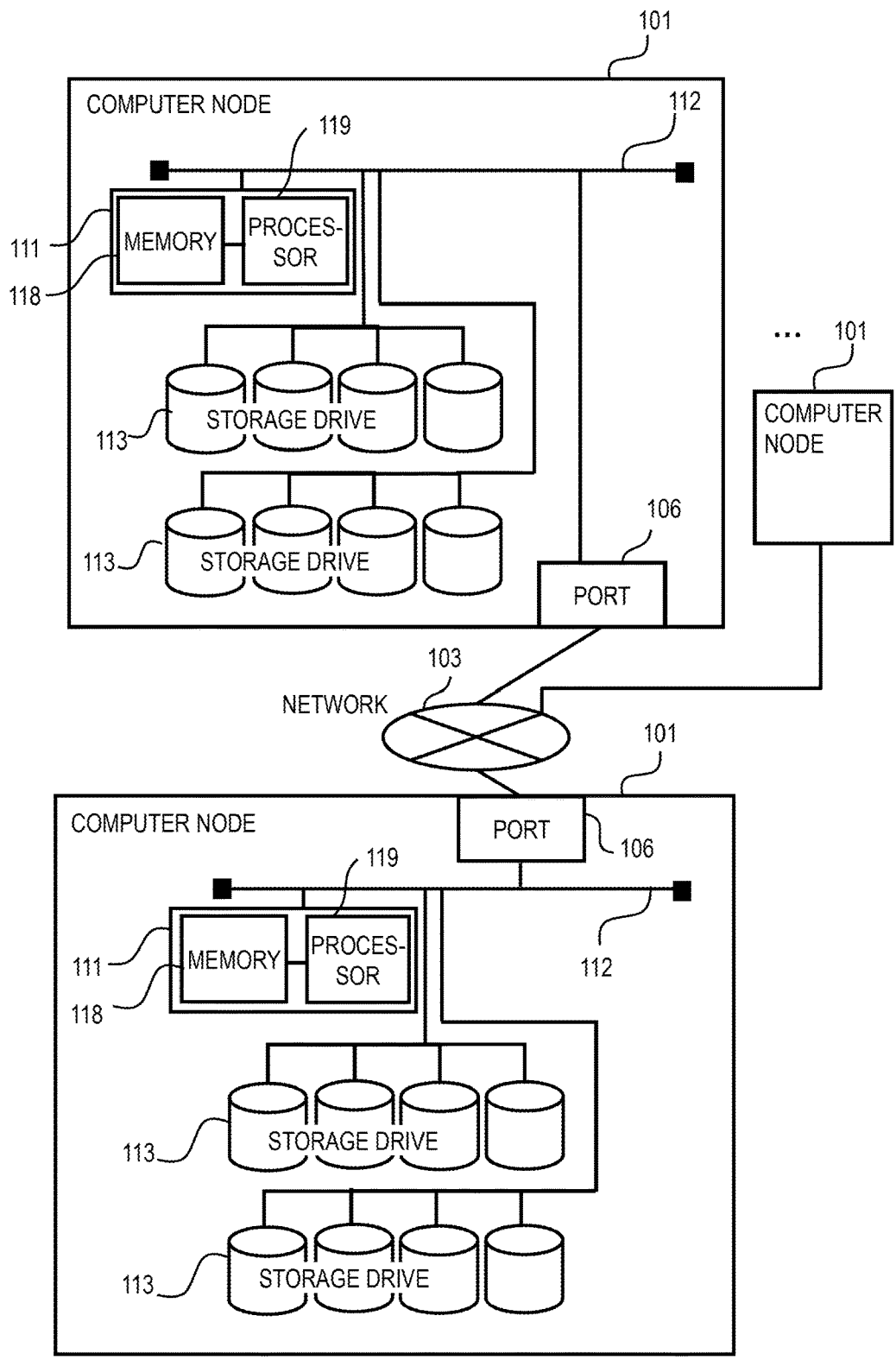
FIG. 2 shows a configuration example of the computer system of the embodiment.

FIG. 2 shows a configuration example of the computer system of this embodiment. The computer system includes a plurality of computer nodes 101 (may also be simply referred to as a node) connected to each other via a network. FIG. 1 showed three computer nodes 101, for example.

The computer node 101 has the configuration of a general server computer, for example. There is no special limitation on the hardware configuration of the computer node. The computer node 101 is connected to a port 106 of another computer node via the network 103. The network 103 is constituted of InfiniBand or Ethernet, for example.

Inside of the computer node, a port 106, a processor package 111, and a storage drive (will also be referred to as a drive below) 113 are connected to each other via an internal network 112. The processor package 111 includes a memory 118 and a processor 119.

The memory 118 stores control information necessary for the processor 119 to process a read or write instruction and to perform the storage function. The memory 118 also stores cache data of the storage. Furthermore, the memory 118 stores programs to be executed by the processor 119, for example. The memory 118 may be a volatile DRAM, a non-volatile SCM (storage class memory), or the like.

Examples of the storage drive 113 include a HDD (hard disk drive) or SSD (solid state drive) that has an interface of FC (Fibre Channel), SAS (Serial Attached SCSI), SATA (serial advanced technology attachment).

The storage drive 113 is managed by the processor package 111, and is directly accessed by the processor package 111 without having another computer node interposed therebetween. The storage drive 113 is connected to the processor package 111 via a so-called DAS (direct access storage) or a back-end switch. The storage drive 113 constitutes a local storage of the computer node 101.

As described above, the life of the storage drive 113 depends on the external write amount. In the descriptions below, the storage drive 113 is a flash drive having a flash memory as a medium. The computer system may also include a control computer.

Figure 3:
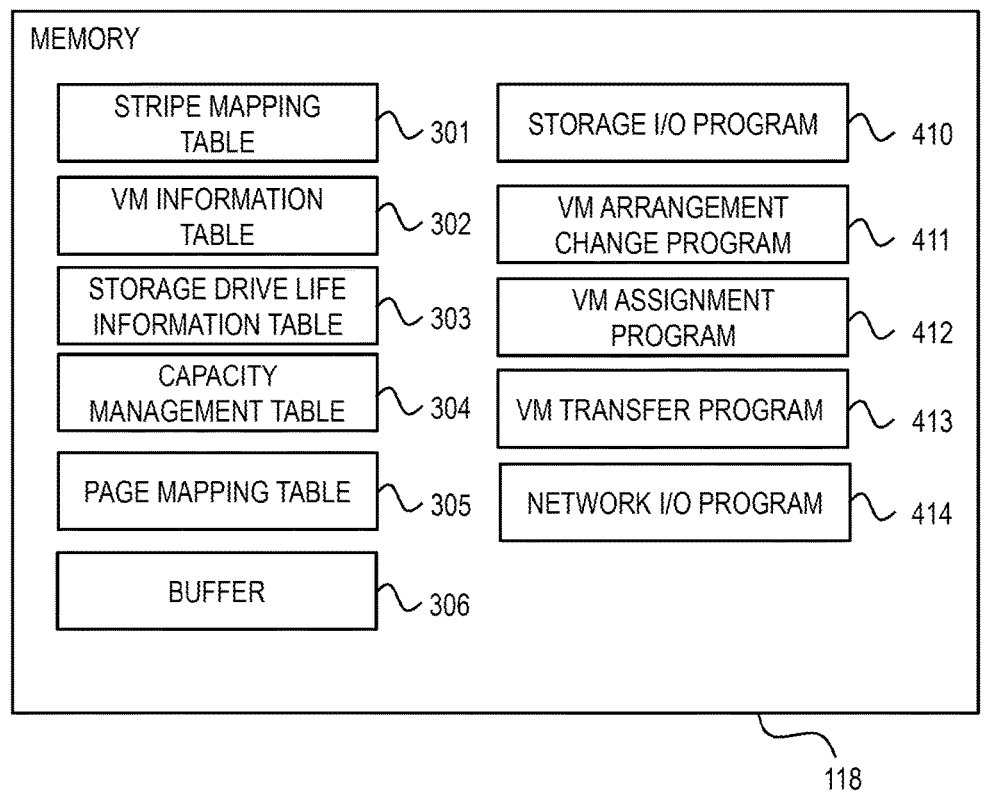
FIG. 3 shows a software configuration example of the computer node of the embodiment.

FIG. 3 shows a software configuration example of the computer node 101 of this embodiment. In FIG. 3, the hypervisor and VM are not shown. The computer node 101 executes the storage I/O program 410, the VM arrangement change program 411, a VM assignment program 412, a VM transfer program 413, and a network I/O program 414. The processor operates in accordance with the programs, thereby realizing a prescribed function.

The memory 118 has control information stored therein. Specifically, the memory 118 has stored therein a stripe mapping table 301, a VM information table 302, a storage drive life information table 303, a capacity control table 304, and a page mapping table 305. The memory also includes a buffer 306. The respective programs and tables will be explained in detail below.

FIG. 4A shows a configuration example of the stripe mapping table 301. The stripe mapping table 301 is referred to by the storage I/O program 410, and indicates the computer nodes to which the write data is transferred to create redundancy of the write data from the VM 201 between the respective nodes.

The stripe mapping table 301 has a stripe type number column 311, and corresponding node columns 312 to 315. The write data from the VM 201 is transferred to other computer nodes indicated by the corresponding node columns 312 to 315 for redundancy. The data is transferred in a block unit of prescribed size.

The value of the stripe type number column 311 is determined by the access address of the write data. The access address is a logical address of a volume that has the write data stored therein. For example, the remainder of a specific value of the access address of the write data is the stripe type number of the write data (access address).

The storage I/O program 410 stores the write data in a local storage and calculates the remainder of the specific value of the access address, thereby determining the stripe type number of the write data. The storage I/O program 410 refers to the stripe mapping table 301, and identifies the computer nodes 101 corresponding to the stripe type number. The storage I/O program 410 transfers the write data to the identified computer nodes 101.

FIG. 4B shows a configuration example of the VM information table 302. The VM information table 302 controls information of the VM 201 operating in the computer node 101. Specifically, the VM information table 302 has a VM number column 321, a write load amount column 322, a virtual volume capacity column 323, a used capacity column 324, and a template information column 325.

The VM number column 321 indicates an identifier of a VM operating in the computer node 101 having the VM information table 302. The write load amount column 322 indicates the write load amount generated by the VM 201. The write load amount is a write amount per unit time, and is the number of time data is written or the size of data written per unit time. The unit of the write load amount is the same as the remaining writable space described above.

The virtual volume capacity column 323 indicates a defined capacity (virtual capacity) of the virtual volume used by the VM 201. The capacity used column 324 indicates the capacity used by the VM 201 in the virtual volume. The virtual volume used by the VM 201 stores image data of the VM 201 therein. The image data of the VM 201 contains programs and data that are executed or used by the VM 201.

The template information column 325 includes the specification of the VM 201. For example, the template information column 325 indicates information of OS and application program operating in the VM 201, or the write amount expected based on the program executed. The template information column 325 is set by the administrator.

FIG. 4C shows a configuration example of the storage drive life information table 303. The storage drive life information 303 manages information regarding the life of the storage drive 113. Specifically, the storage drive life information table 303 includes a drive number column 331, a remaining writeable space column 332, an operation time column 333, a consumption life rate column 334, and a WA (write amplification) model column 335.

The drive number column 331 indicates an identifier of the local drive 113 of the computer node 101 that has the storage drive life information table 303. The remaining writable space column 332 indicates the remaining writable space for each storage drive 113. The remaining writable space can be calculated as follows.

The operation time column 333 indicates the operation time of each storage drive 113. The consumption life rate column 334 indicates the consumption life rate of each storage drive 113. The consumption life rate represents the degree of wear of the storage drive 113 caused by data writing.

The WA model column 335 stores therein the information of WA model that represents the property of write amplification of each storage drive 113. The WA model represents the relationship between the capacity used of the storage drive 113 and WA, for example. The WA model takes the form of a graph or approximate expression. The WA model can be used for the calculation for the remaining writable space.

FIG. 4D shows a configuration example of the capacity management table 304. The capacity management table 304 manages the capacity of each storage drive 113. The capacity management table 304 includes a drive number column 341, a remaining capacity column 342, a physical capacity column 343, a logical capacity column 344, and a compression rate column 345.

The remaining capacity column 342 indicates the remaining physical capacity for each storage drive 113. The physical capacity column 343 indicates the physical capacity of each storage drive 113. The logical capacity column 344 indicates the capacity viewed from the processor 119 for each storage drive 113. The compression rate column 345 indicates the current data compression rate of each storage drive 113. The information of the capacity management table 304 is provided by each storage drive 113.

FIG. 4E shows a configuration example of the page mapping table 305. The page mapping table 305 manages data stored in the storage drive 113 or the buffer 306 of the computer node 101 that has the page mapping table 305.

The page mapping table 305 indicates the corresponding relationship between the pages of the virtual volume and the pages of the storage drive 113 (physical drive). The page mapping table 305 further indicates the relationship between those pages and the pages inside of the buffer.

The page mapping table 305 includes a hush value column 351, a transfer information column 352, a node number (1) column 353, a virtual volume (VVOL) number (1) column 354, and a page number (1) column 355. The page mapping table 305 further includes a node number (2) column 356, a virtual volume (VVOL) number (2) column 357, a page number (2) column 358, a buffer address column 359, a drive number column 360, and a page number column 361.

The page mapping table 305 of this embodiment is a hush table. The hush value column 351 stores therein the hush value of the page data. The page is a unit of a storage area to be assigned to the virtual volume. The redundancy block and the page size may be the same as each other. In this case, the buffer address column 359 manages the buffer per page.

The transfer information column 352 indicates the information regarding the data attribute and transfer information of each entry. Specifically, the transfer information column 352 indicates whether the data of an entry is data of the storage I/O that is stored in the local drive 113, or data of the network I/O that is transferred between the computer nodes 101 and not stored in the local drive 113.

The storage I/O data and the network I/O data are stored in different entries even if both has the same hush value. The storage I/O data is processed by the storage I/O program 410, and the network I/O data is processed by the network I/O program 414.

The network I/O data is data transferred between respective VMs 201 of different computer nodes 101 (between application programs 202, for example). As described below, the buffer 306 stores therein the network I/O data to be transferred to other computer nodes 101 and the network I/O data received from other computer nodes 101.

The VM 201 (application program 202) hands over write data, which is the network I/O data transferred from other computer nodes 101, together with a write request to the storage I/O program 410 so that the write data is written in the storage drive 113.

The storage I/O data includes normal write data and mirror data transferred from other computer nodes 101. The transfer information column 352 indicates whether the storage I/O data is write data or mirror data.

The transfer information column 352 indicates whether the data of each entry has been transferred to other computer nodes 101 or not. If the data of an entry has been transferred, the transfer information column 352 indicates the information of the destination computer nodes 101.

The node number (1) column 353, the virtual volume (VVOL) number (1) column 354, and the page number (1) column 355 show the page of the virtual volume that contains the data with the hash value.

The node number (2) column 356, the virtual volume (VVOL) number (2) column 357, and the page number (2) column 358 show the page of another virtual volume that contains the data with the hash value. Although FIG. 4E shows the columns of two virtual pages, the page mapping table 305 has columns for at least three virtual pages.

The data is logically stored in the virtual volume, and the actual data is stored in the storage drive 113 having a physical storage area. A cell not having a corresponding value contains a NULL value, for example. An entry of the data stored only in the buffer 306, for example, contains a NULL value in the cell for the information regarding the virtual volume and storage drive.

The buffer address column 359 indicates the address of the buffer 306 containing the data with the hush value. The drive number column 360 and the page number column 361 indicate the page of the storage drive 113 where the data with the hush value is actually stored. The buffer address column 359 and the drive number column 360 indicate the buffer 306 and the page of the storage drive 113 of the computer node 101 that contains this page mapping table 305.

As described above, the page mapping table 305 indicates the corresponding relationship between the hush value and address, as well as the corresponding relationship between the logical address (address of the virtual volume) and the physical address. If the target data is parity, a plurality of logical addresses of the data used to generate the parity are associated.

If the target data is actual data, generally, one logical address (page of the virtual volume) is associated. If the target data is duplicate data, a common physical page is assigned to different logical addresses that store the duplicate data by deduplication.

Figure 5:
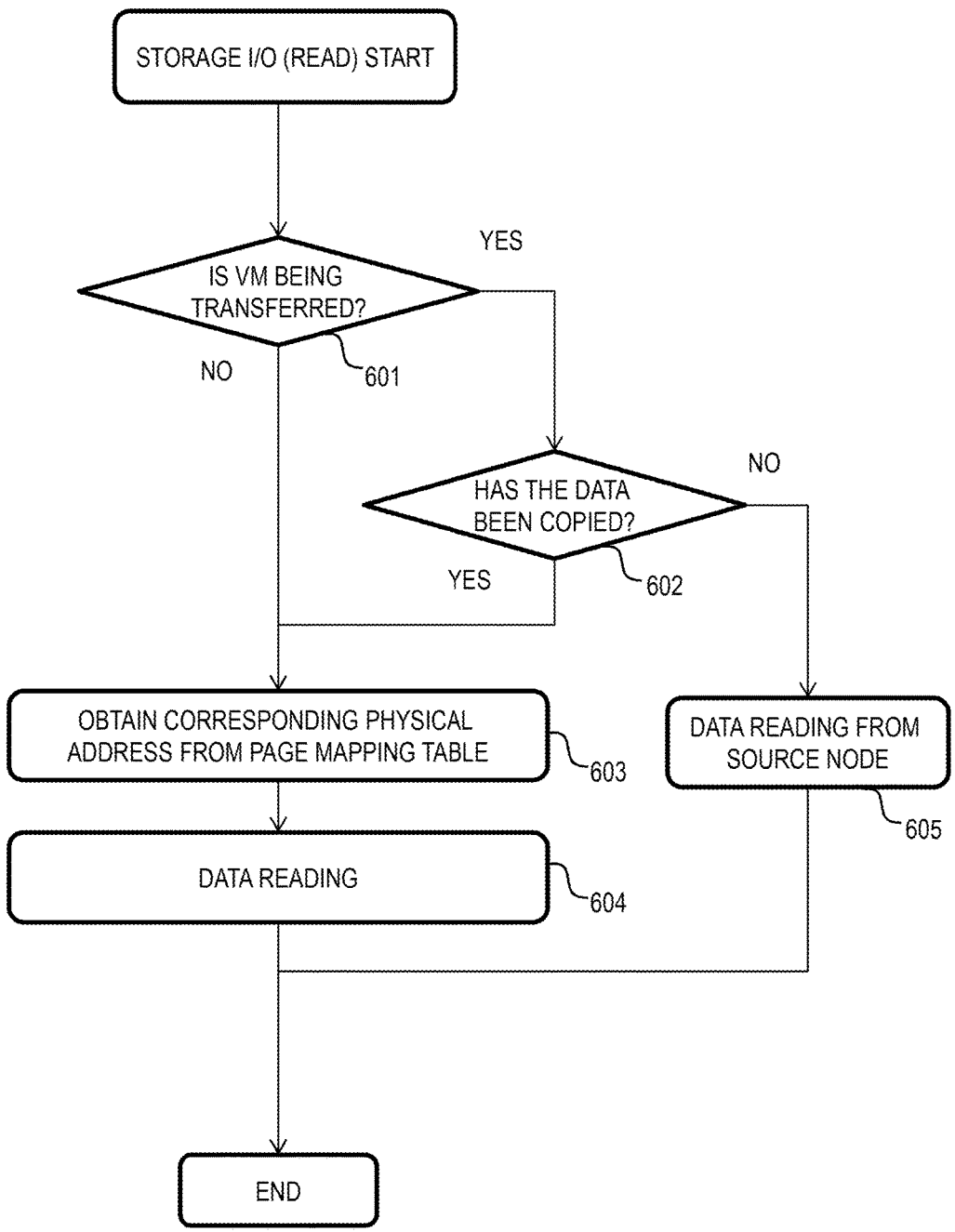
FIG. 5 shows a flowchart of the storage I/O process (read) of the embodiment.

FIG. 5 shows a flowchart of the storage I/O process (read) of this embodiment. After receiving a read request, the storage I/O program 410 operates in accordance with the flowchart. The storage I/O program 410 refers to the status of the VM transfer process by the VM transfer program 413 described below, and reads data. The VM transfer program 413 performs the live migration of the VM 201.

In the live migration, the data of VM 201 including the application program 202 and the OS 203 is transferred between the respective memories 118 of the computer nodes 101, and the VM image data is transferred to the storage drive 113 of the destination computer node 101.

When the VM 201 including the data to be read is not being transferred, the data is stored in the local drive 113. When the VM 201 including the data to be read is being transferred, the target data exists in the source computer node 101 or the destination computer node 101.

The storage I/O program 410 receives a read request from the application program 202, for example. If the VM 201 executing the application program 202 is being transferred, the storage I/O program 410 of the destination computer node 101 receives a read request from the transferred application program 202.

The storage I/O program 410 determines whether the VM 201 including (managing) the application program 202 and the target data is being transferred or not (Step 601). For example, the storage I/O program 410 sends a query to the VM transfer program 413 on whether the VM 201 is being transferred or not.

If the VM 201 is being transferred (Step 601: YES), the storage I/O program 410 determines whether the target data has been copied in the destination computer node 101 or not (Step 602). For example, the storage I/O program 410 sends a query to the VM transfer program 413 on whether the target data has been copied or not.

If the target data has not been copied (Step 602: No), the storage I/O program 410 reads the data from the source computer node 101 (Step 605). The storage I/O program 410 sends a read request to the source computer node 101 with a specific address, and receives the returned target data.

If the target data has been copied (Step 602: Yes), the storage I/O program 410 proceeds to Step 603. If the VM 201 is not being transferred (Step 601: No), the storage I/O program 410 also proceeds to Step 603.

In Step 603, the storage I/O program 410 obtains the corresponding physical address from the page mapping table 305. The storage I/O program 410 reads out the data of the corresponding physical address from the storage drive 113 (Step 604).

With the flow described above, it is possible to refer to the most recent data appropriately regardless of the address specified by the read request. If the target data to be read is the data duplicated by the application program 202, the target data might not exist due to the process to reduce the data amount (parity process) as described below. The storage I/O program 410 can generate the target data to be read by sending a query to the computer node 101 having the original data or by restoring data from the parity. The node with the original data can be found efficiently using the hash table described below.

Figure 6:
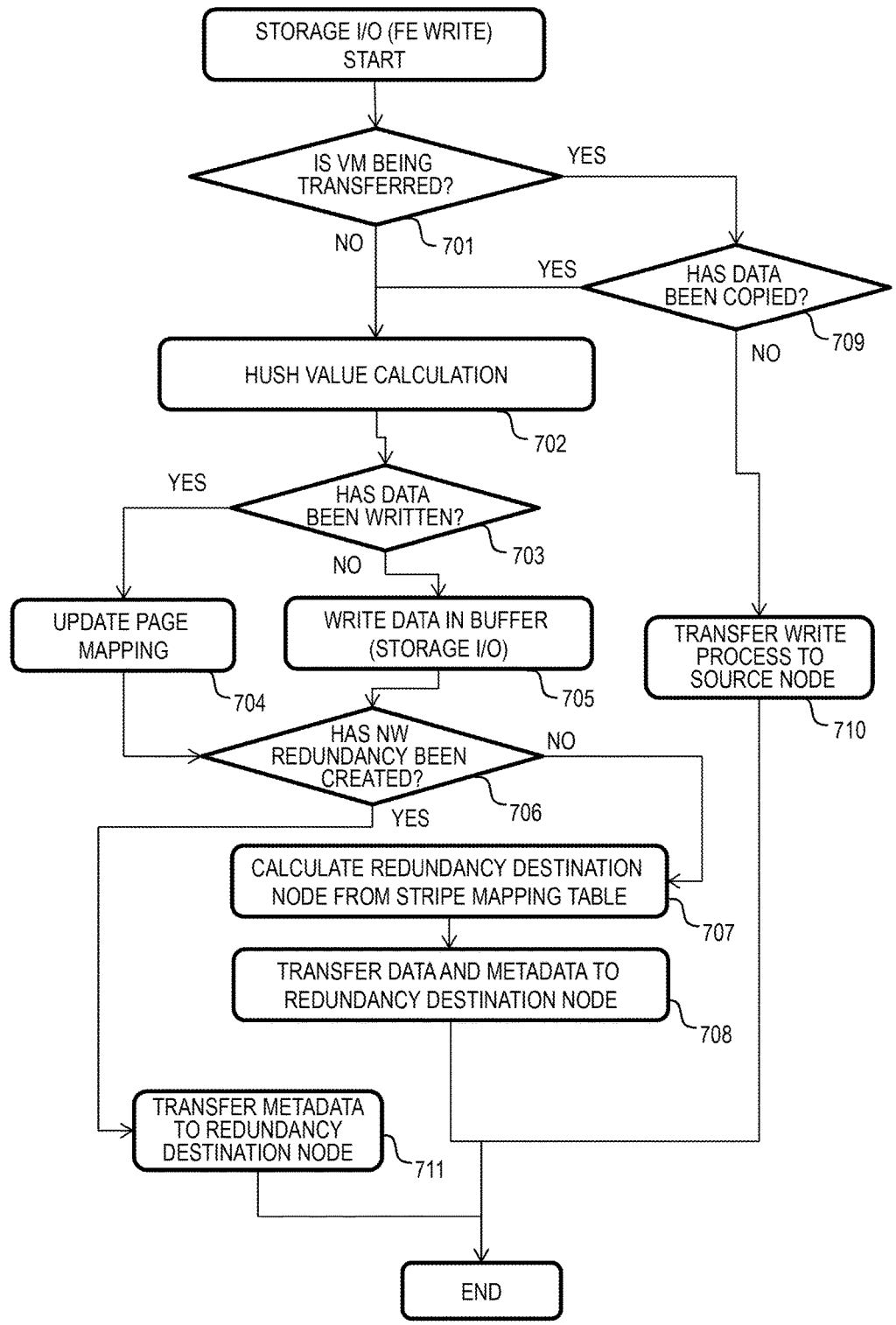
FIG. 6 shows a flowchart of the storage I/O process (front end write) of the embodiment.

FIG. 6 shows a flowchart of the storage I/O process (front end write) of this embodiment. The front end write is a process from receiving the write data to writing that data in the buffer 306. The frond end write of this embodiment also includes transferring the data for redundancy to other computer nodes 101.

The overview of this process will be explained. If the same data as the received write data is already stored in the storage drive 113, the storage I/O program 410 does not write the data into the storage drive 113, but instead updates the page mapping table 305, which is a virtual write process. This makes it possible to reduce the amount of data written into the storage drive 113.

Specifically, the storage I/O program 410 calculates the hush value of the write data, and compares the hush value with the value of the hush value column 351 of the page mapping table 305. If there is the same hush value, the storage I/O program 410 performs the virtual write process. That is, the storage I/O program 410 adds the recipient of the write request to the entry having the same hush value.

In a method in which duplicate data of mirror data that has occurred at another node is detected by the mirroring function of the application, the respective nodes contain a global hush table. That hush table indicates an identifier of each node that stores the corresponding data, using the data hush value as the key. The hush table may also include information of identifiers of respective nodes having the reference data.

The hush table may be configured such that only a part thereof is maintained, using a prescribed algorithm (LRU algorithm, for example), to reduce the usage of memory. It is also possible to configure such that one hush value of the data and one node correspond to each other, the hush value is assigned to the node using the consistent hush, and the assigned node maintains the assigned range of the hush table.

The storage I/O program 410 searches the hush value column 351 of the page mapping table 305 for the same hush value, and if the same hush value does not exist, the storage I/O program 410 searches the global hush table (sending the node number and hush value to the node that manages the hush table corresponding to the hush value).

If there is the same hush value in the global hush table, the storage I/O program 410 receives the node number and the address information of the page, and performs the virtual write process described above. The node of the global hush table that has received the query stores the information of the source node associated with the hush value.

If the global hush table does not have the same hush value, the storage I/O program 410 proceeds to Step 705. The node of the global hush table that has received the query stores the information of the source node associated with the hush value as the node containing the data.

If the method described above was simply applied, there would be only one node having the original of the mirror data, but by including the load due to the access frequency of the page or statistical learning information in the hush table, it is possible to contain the mirror data for pages with higher load in a plurality of nodes, which efficiently reduces the network transfer and improves the storage capability.

If the duplicate data has already been transferred to other computer nodes 101 (destinations of mirroring) for redundancy, the storage I/O program 410 transfers metadata only to the destination computer node 101. The destination computer node is indicated by the stripe mapping table 301.

By sending metadata only, the network band and the capacity consumption of each destination (destination of the mirroring) can be reduced. The metadata indicates the hush value and the target address of the write data (logical address of the virtual volume). The transfer computer node 101 updates the page mapping table 305 by the received metadata. The storage I/O program 410 refers to the transfer information column 352 of the page mapping table 305, and determines whether the duplicate data has been transferred or not.

If the duplicate data has not been transferred, the storage I/O program 410 transfers the write data to the computer node 101 indicated by the stripe mapping table 301. The storage I/O program 410 sends the target address of the write data together with the write data.

The specific process flow will be explained with reference to FIG. 6. After receiving the write request, the storage I/O program 410 operates in accordance with the flowchart. The storage I/O program 410 receives a read request from the application program 202, for example. If the VM 201 executing the application program 202 is being transferred, the storage I/O program 410 of the destination computer node 101 receives a write request from the transferred application program 202.

The storage I/O program 410 determines whether the VM 201 including (managing) the application program 202 and the target data (address) is being transferred or not (Step 701). For example, the storage I/O program 410 sends a query to the VM transfer program 413 on whether the VM 201 is being transferred or not.

If the VM 201 is being transferred (Step 701: Yes), the storage I/O program 410 determines whether the target address data has been copied in the destination computer node 101 or not (Step 709). For example, the storage I/O program 410 sends a query to the VM transfer program 413 on whether the target address data has been copied or not. If the data has not been copied (Step 709: No), the storage I/O program 410 transfers the write request to the source computer node 101 (Step 710), and ends the process.

If the target address data has been copied (Step 709: Yes), that means that the latest data exists in the destination computer node 101, and therefore, the storage I/O program 410 continues the process. If the VM 201 is not been transferred (Step 701: No), the storage I/O program 410 also continues the process.

The storage I/O program 410 calculates the hush value of the write data (Step 702). The hush value may be calculated by a known method such as CRC, MD5, and SHA. The storage I/O program 410 searches the hush value column 351 of the page mapping table 305. The storage I/O program 410 determines whether the write data has already been written or not based on the determination result on whether the same value as the calculated hush value exists or not (Step 703).

In this step, the storage I/O program 410 also checks if there is the same hush value for the data of the buffer 306, and determines whether the data has already been written. As described with reference to FIG. 4E, the buffer data is also managed by the page mapping table 305.

If the write data has already been written (Step 703: Yes), the storage I/O program 410 updates the page mapping table 305 (Step 704). Specifically, the storage I/O program 410 associates a virtual page of the write target with the page of the physical address that has already been written.

With this process, a plurality of logical pages correspond to one physical page, which makes it possible to reduce the data to be written in the drive, and increases the available storage capacity.

In Step 704, if the buffer, in which the network I/O program 414 described below has written data, has the same data, such data is likely to have occurred due to the redundancy process of the application program 202. The storage I/O program 410 may use that data in a manner similar to the mirror data by the storage I/O. The storage I/O program 410 generates parity from that data and other types of mirror data, and registers that information in the page mapping table 305.

The storage I/O program 410 writes data into the local storage (storage drive 113) and creates redundancy of the data between the computer nodes 101. The network I/O program 414 does not store data into the local storage (storage drive 113) and instead transfers data between respective VMs 201 of the different computer nodes 101.

Next, the storage I/O program 410 determines whether the network redundancy has been created or not (Step 706). The network redundancy means that data held by the computer node 101 has already been transferred to other computer nodes 101 for redundancy. The stripe mapping table 301 indicates the computer nodes 101 that have received the data for redundancy. In this embodiment, in addition to the network redundancy by the storage I/O program 410, the VM 201 creates network redundancy.

Specifically, the application program 202 (such as NoSQL) having the data redundancy function transfers the data to other computer nodes 101 for redundancy by the network I/O program 414. The redundancy data transferred through the network communication process by the application program 202 (such as NoSQL) having the data redundancy function is stored in the buffer 306 of the memory 118. This data is managed in the page mapping table 305.

The storage I/O program 410 calculates the hush value, thereby detecting the redundancy of the data. The network redundancy is managed by the transfer information column 352 of the page mapping table 305. The transfer information column 352 maintains the information of the computer node 101 that has transferred the data.

If the redundancy has been created (Step 706: Yes), the storage I/O program 410 sends metadata alone to the destination node (Step 711), and ends this process. The metadata indicates the hush value and the address where the data is stored. There are only two possible cases: the storage write I/O had occurred before the storage write I/O occurred; or the redundancy data had been created due to the network transfer of the application before the storage write I/O occurred.

If the write data has not already been written (Step 703: No), the storage I/O program 410 writes that data into the buffer (Step 705). In the buffer, the data written by the storage I/O program 410 and the data written by the network I/O program 414 are stored. Because those two types of data have different meanings, they are separately managed by the transfer information column 352 of the page mapping table 305.

If the network redundancy has not been created (Step 706: No), the redundancy is created by the storage I/O process. First, the storage I/O program 410 calculates the redundancy destination node from the stripe mapping table 310 (Step 707), transfers the data and metadata to the destination node (Step 708), and ends the process after the transfer is completed. The metadata is the information necessary to identify the sent data in the destination, and includes the logical address and the like. In this process, the storage I/O program 410 may select a plurality of destination nodes and perform a plurality of transfer processes, depending on the degree of redundancy required for the system.

Figure 7:
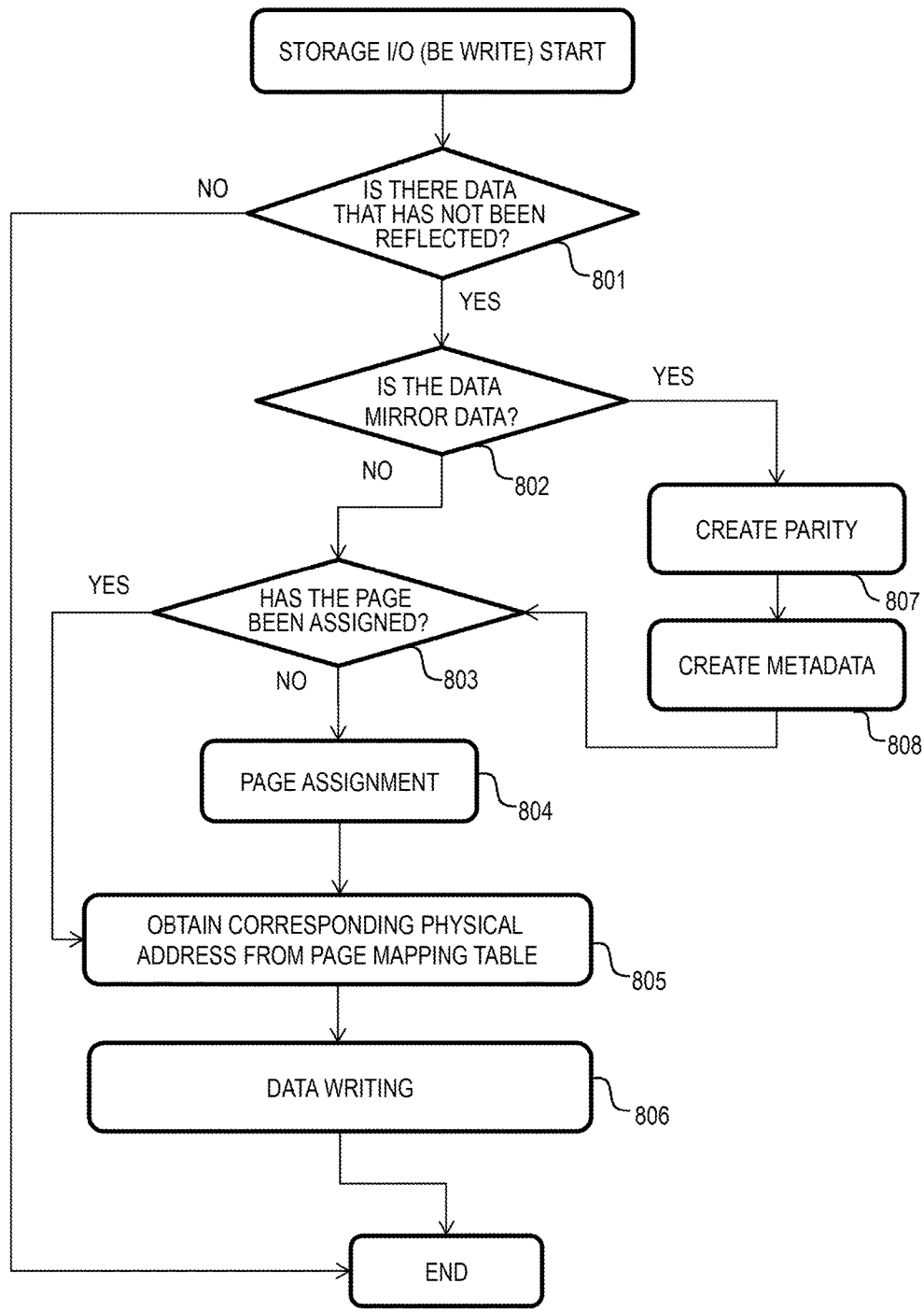
FIG. 7 shows a flowchart of the storage I/O process (back end write) of the embodiment.

FIG. 7 shows a flowchart of the storage I/O process (back end write) of this embodiment. The back end write is performed to reflect the non-reflected data in the buffer to the storage drive 113 (physical storage area). Specifically, data stored in the buffer or data generated from the data stored in the buffer is written in the physical storage area of the storage drive 113.

The storage I/O program 410 processes the data in the buffer 306 in an asynchronous manner with the write request. If the usage of the buffer 306 is high, the storage I/O program 410 may open the storage area of the buffer 306 at the same time as the write request.

The buffer 306 has a prescribed capacity. When the usage exceeds a specified value, older data is deleted. Generally FIFO is used, but another type of scheduling algorithm (LRU, for example) may also be used. The write data to be written into the storage drive 113 is deleted after the data is written into the storage drive 113 (storage medium).

The storage I/O program 410 generates parity (Erasure code) from the mirror data that has been transferred from the plurality of other computer nodes 101 and is stored in the buffer 306, and writes the parity only in the storage drive 113. This makes it possible to reduce the amount of data written into the storage drive 113.

The data that was stored in the buffer 306 during the transfer process to other computer nodes 101 by the network I/O program 414 (transfer data) does not need to be written into the storage drive 113 (not considered the non-reflected data). Thus, this data is deleted from the buffer 306 without being processed. When the data is deleted in the buffer 306, the corresponding entry is deleted from the page mapping table 305.

The specific process flow will be explained with reference to FIG. 7. The storage I/O program 410 refers to the page mapping table 305, and determines whether there is data to be reflected in the storage drive 113 or not (Step 801). An entry in which the transfer information column 352 indicates the storage I/O data, and the drive number column 360 and the page number column 361 each have a NULL value is the data to be reflected.

If data to be reflected exists in the buffer 306 (Step 801: Yes), the storage I/O program 410 determines whether the data to be reflected is mirror data or not (Step 802). The mirror data is data transmitted for redundancy, and data transferred from other nodes 101 in Step 708. The transfer information column 352 indicates whether the data in an entry is mirror data or not.

If the data to be reflected is mirror data (Step 802: Yes), the storage I/O program 410 generates parity together with different types of mirror data (Step 807), and also generates metadata (Step 808). The parity may be generated through a known erasure coding method (Reed Solomon coding, for example).

A group of data blocks for which parity is to be made is preferably pieces of data transferred for redundancy and having different source nodes. The metadata indicates a logical address (or physical address) of a computer node 101 from which the parity was generated, and is stored in the page mapping table 305. The metadata is referred to when data is restored.

Thereafter, the storage I/O program 410 proceeds to Step 803. If the target data is not mirror data (Step 802: No), the storage I/O program 410 also proceeds to Step 803.

When the target data is not mirror data, the target data is write data for the write request issued by the computer node 101 (data written in the buffer in Step 705). The storage I/O program 410 performs a series of write processes for the storage drive 113 from Step 803 to Step 806.

Specifically, the storage I/O program 410 refers to the page mapping table 305 and determines whether the corresponding relationship between the target virtual page and the physical page has been already established (Step 803). If the physical page has already been assigned to the target virtual page (Step 803: Yes), the storage I/O program 410 proceeds to Step 805.

If the physical page has not been assigned to the target virtual page (Step 803: No), the storage I/O program 410 changes the page mapping table 305 so that a physical page that has not been assigned is assigned to that virtual page (Step 804).

In Step 805, the storage I/O program 410 obtains the drive number and page number corresponding to the target virtual page from the page mapping table 305. The storage I/O program 410 writes the target write data into the physical address corresponding to the obtained drive number and page number (Step 806). The storage I/O program 410 deletes the target data from the buffer 306, and ends the process.

Figure 8:
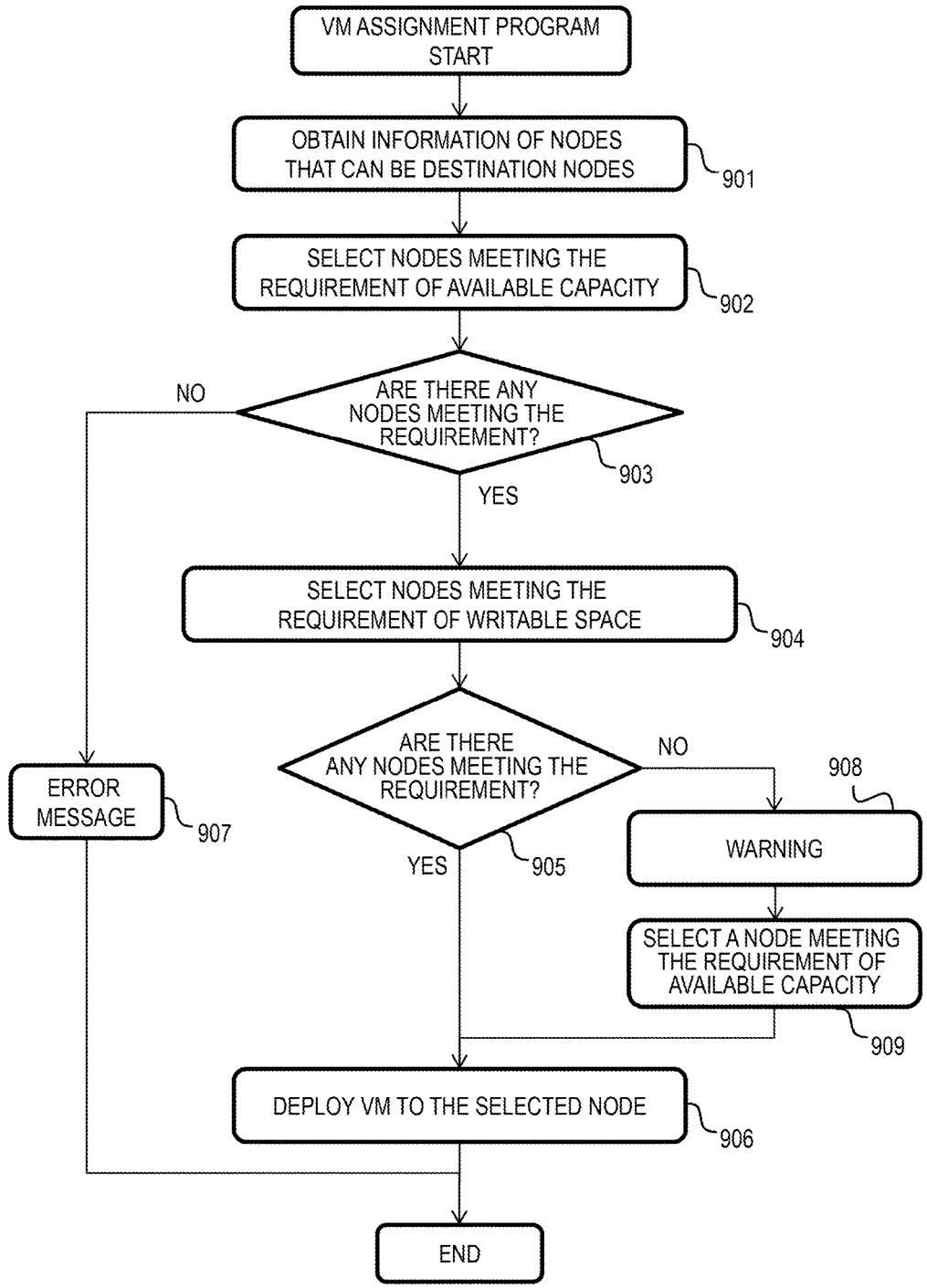
FIG. 8 shows a flowchart of the VM assignment program of the embodiment.

FIG. 8 shows a flowchart of the VM assignment program 412 of this embodiment. This process is performed to deploy a VM 201. To deploy a VM 201 means to assign a VM 201 to the computer node 101 and operate the VM 201. More specifically, VM image data is stored in the storage drive 113 of the computer node 101, and the VM 201 is operated in the memory 108 thereof. The VM assignment program 412 determines a computer node to assign a VM based on the writable space and the available capacity of the storage drive 113 of the node.

The user operates a control computer not shown in the figure or any of the computer nodes 101 (user terminal), and instructs the VM assignment program 412 of any of the computer nodes 101 to deploy a VM 201. This instruction indicates the location of the VM image data and the configuration information of the VM image data. The VM assignment program 412 that received the instruction performs the process of the flowchart of FIG. 8. This process may be performed by the control computer.

The VM assignment program 412 obtains information of the computer nodes 101 to which the VM can be assigned (Step 901). Specifically, the VM assignment program 412 obtains the VM information table 302, the storage drive life information table 303, and the capacity management table 304 from the respective computer nodes 101.

The computer system may centrally manage the information of the computer nodes 101 using a distributed database (SQL or NoSQL), KVS (key value store), or the like. The VM assignment program 412 obtains those types of information from the database.

Next, the VM assignment program 412 selects the computer nodes 101 that meet the requirement of the available capacity for the VM 201 to be deployed (Step 902). The available capacity required for the VM 201 is specified by a user or set in advance for the programs included in the VM 201.

The VM assignment program 412 refers to the capacity management table 304 of each computer node 101, and selects the computer nodes 101 having the required available capacity based on the values of the remaining capacity column 342. The available capacity is calculated for each pool, for example, and at least one of the pools needs to have the required available capacity. The capacity management table 304 manages the capacity of the storage drive 113 for each pool. The capacity management table 304 shown in FIG. 4D contains the information for one pool. In the descriptions below, each computer node 101 has one pool.

If there is no computer node 101 that meets the requirement of the available capacity (Step 903: No), it is not possible to deploy the VM 201. The VM assignment program 412 outputs an error message to the user terminal (Step 907).

If there are computer nodes 101 that meet the requirement of the available capacity (Step 903: Yes), the VM assignment program 412 selects computer nodes 101 that meet the requirement of the writable space (remaining writable space) for the VM 201 to be deployed among the group of the computer nodes (Step 904).

The VM assignment program 412 calculates the writable space of the VM 201 to be deployed based on the designed write load amount of the programs to be executed (including OS and application programs). Also, the VM assignment program 412 calculates the remaining writable space of each computer node 101 after the VM 201 is deployed, based on the information of the storage drive life information table 303.

The calculated remaining writable space is the smallest remaining writable space in the storage drive 113 assigned to the VM 201 to be deployed. The VM assignment program 412 estimates the write load amount of the VM 201 for each of the storage drives 113. For example, the VM assignment program 412 estimates the write load amount of the VM 201 for each storage drive 113, taking into consideration the number of storage drives 113 that provide the storage area to a pool, or the capacity provided to the pool by those storage drives 113, the preset write load amount of the VM 201, the WA model 335, and an increased amount of the write amount by mirroring of the storage indicated in the stripe mapping table 301.

The VM assignment program 412 estimates the remaining writable space of each storage drive 113 based on the value of the remaining writable space column 332 of the storage drive life information table 303 and the estimated write load amount of the VM 201 for the storage drive 113. If all of the values of the remaining writable space are positive, the requirement of the remaining writable space is met. If the computer node 101 has a plurality of pools, the requirement of the remaining writable space in the available capacity is checked for each pool.

If there is no computer node 101 that meets the requirement of the writable space (Step 905: No), the VM assignment program 412 outputs a warning to the user terminal to indicate that the life requirement might not be met (Step 908). The VM assignment program 412 selects one of the computer nodes 101 that were deemed to have met the requirement of the available capacity in Step 902 (Step 909), and deploys the VM 201 to the computer node 101 (Step 906).

Specifically, the VM assignment program 412 that received an instruction from the user terminal transfers the VM image data to the selected calculator node 101, and instructs the selected computer node 101 to deploy the VM 201.

If there is a computer node 101 that meets the requirement of the writable space (Step 905: Yes), the VM assignment program 412 deploys the VM 201 to the computer node 101 (Step 906). As described above, in this embodiment, the VM 201 can be deployed in an appropriate computer node 101 that meets the requirements of the writable space and available capacity.

In another example, the VM assignment program 412 also takes into consideration, in the process to decide a computer node to deploy the VM, the mirror data that would be transferred between the computer nodes 101 for redundancy when the VM 201 is deployed.

When the VM 201 is deployed in the computer node 101, the mirror data of the VM 201 is transferred from the computer node 101 to the computer node 101 indicated by the stripe mapping table 301. The write load amount of the destination computer node 101 increases. The VM assignment program 412 selects a computer node 101 to deploy the VM in Step 904 so that the value of the remaining writable space is also positive in the computer node 101 that is to receive the mirror data.

For example, the function to find an increased amount of the write load amount at a computer node "i" caused by an increase in write load amount at a computer node "r" due to the replication of the storage I/O program 410 is provided in advance. The VM assignment program 412 uses this function and estimates an increased amount of the write load amount at other computer nodes 101 indicated by the stripe mapping table 301 when the VM 201 is deployed in those computer nodes.

The VM assignment program 412 estimates the remaining writable space in other computer nodes 101 based on the estimated increase amount of the write load amount and the information of the storage drive life information table 303. By referring to the remaining writable space of respective computer nodes that constitute a redundancy group between the computer node in which the VM 201 is deployed and the storage I/O, in addition to the writable space of the computer node in which the VM 201 is to be deployed, it is possible to deploy the VM 201 to the most appropriate computer node 101.

Figure 9:
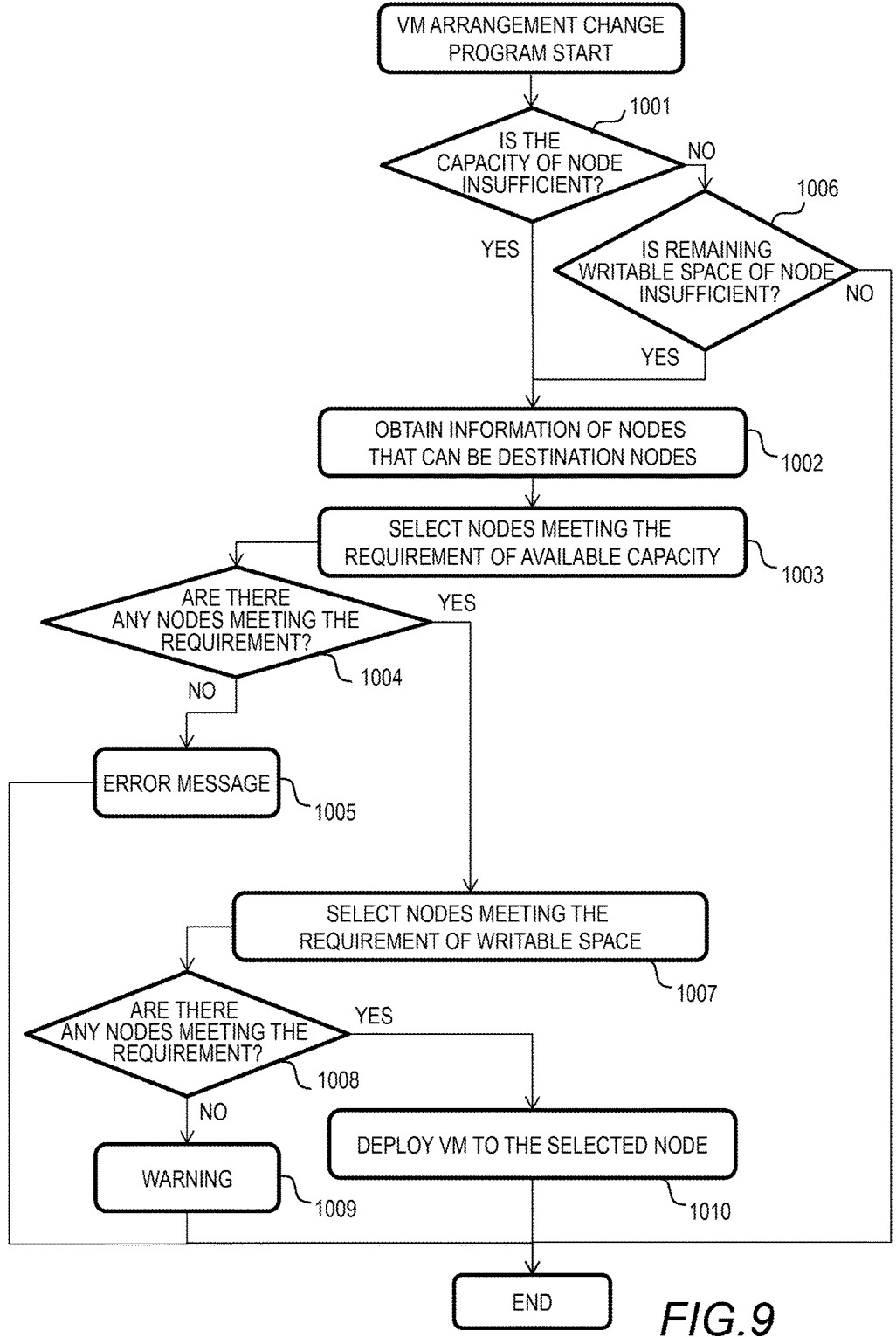
FIG. 9 shows a flowchart of the VM arrangement change program of the embodiment.

FIG. 9 shows a flowchart of the VM arrangement change program 411 of this embodiment. This process is conducted to review the arrangement of the deployed VMs 201 and to transfer a VM 201 so that the requirements of the writable space and available capacity are met.

This process may be conducted at a certain interval in each computer node 101, or may be conducted when a certain event of the VM 201 such as start-up or shut-off occurs. Also, this process may be conducted when the write load of the VM 201 significantly changes such as when a change is made to the settings of the application program 202. The VM arrangement change program 411 may conduct this flow by selecting the VMs 201 operating in the computer node 101 one by one.

The VM arrangement change program 411 determines whether the available capacity of the computer node 101 is insufficient or not (Step 1001). For example, the VM arrangement change program 411 refers to the capacity management table 304, and compares the value of the remaining capacity column 342 with a threshold value, thereby determining whether the available capacity is insufficient or not. For example, the VM arrangement change program 411 compares the highest value of the remaining capacity 342 with the threshold value.

If the available capacity of the computer node 101 is not insufficient (Step 1001: No), the VM arrangement change program 411 deter mines whether the remaining writable space of the computer node 101 is insufficient or not (Step 1006). For example, the VM arrangement change program 411 compares the highest value of the remaining writable space with the threshold value. If the remaining writable space of the computer node 101 is not insufficient (Step 1006: No), the VM arrangement change program 411 ends this process.

If the available capacity of the computer node 101 is insufficient (Step 1001: Yes), or if the remaining writable space is insufficient (Step 1006: Yes), the VM arrangement change program 411 obtains the information of respective computer nodes to which the VM 201 can be deployed (Step 1002). Step 1002 is the same as Step 901. The computer node 101 to obtain the information from may be specified in advance.

Next, the VM arrangement change program 411 selects the computer nodes 101 that meet the requirement of the available capacity for the target VM 201 (Step 1003). Step 1003 is the same as Step 902.

If there is no computer node 101 that meets the requirement of the available capacity in the computer node 101 from which the information was obtained (Step 1004: No), it is not possible to transfer the VM 201. The VM arrangement change program 411 outputs an error message to a control terminal (user terminal) (Step 1005).

If there is a computer node 101 that meets the requirement of the available capacity (Step 1004: Yes), the VM arrangement change program 411 performs the steps 1007 to 1010. Steps 1007 to 1009 are the same as Steps 904, 905, and 908, respectively.

If there is a computer node 101 that meets the requirements of the available capacity and the remaining writable space, i.e., the computer node to which the VM can be transferred (Step 1004: Yes, Step 1008: Yes), the VM arrangement change program 411 transfers the VM 201 to the computer node 101 by the VM transfer program 413. The method to transfer the VM 201 will be described later.

As described above, the VM 201 can be transferred to an appropriate computer node 101 that meets the requirements of the writable space and available capacity.

Figure 10:
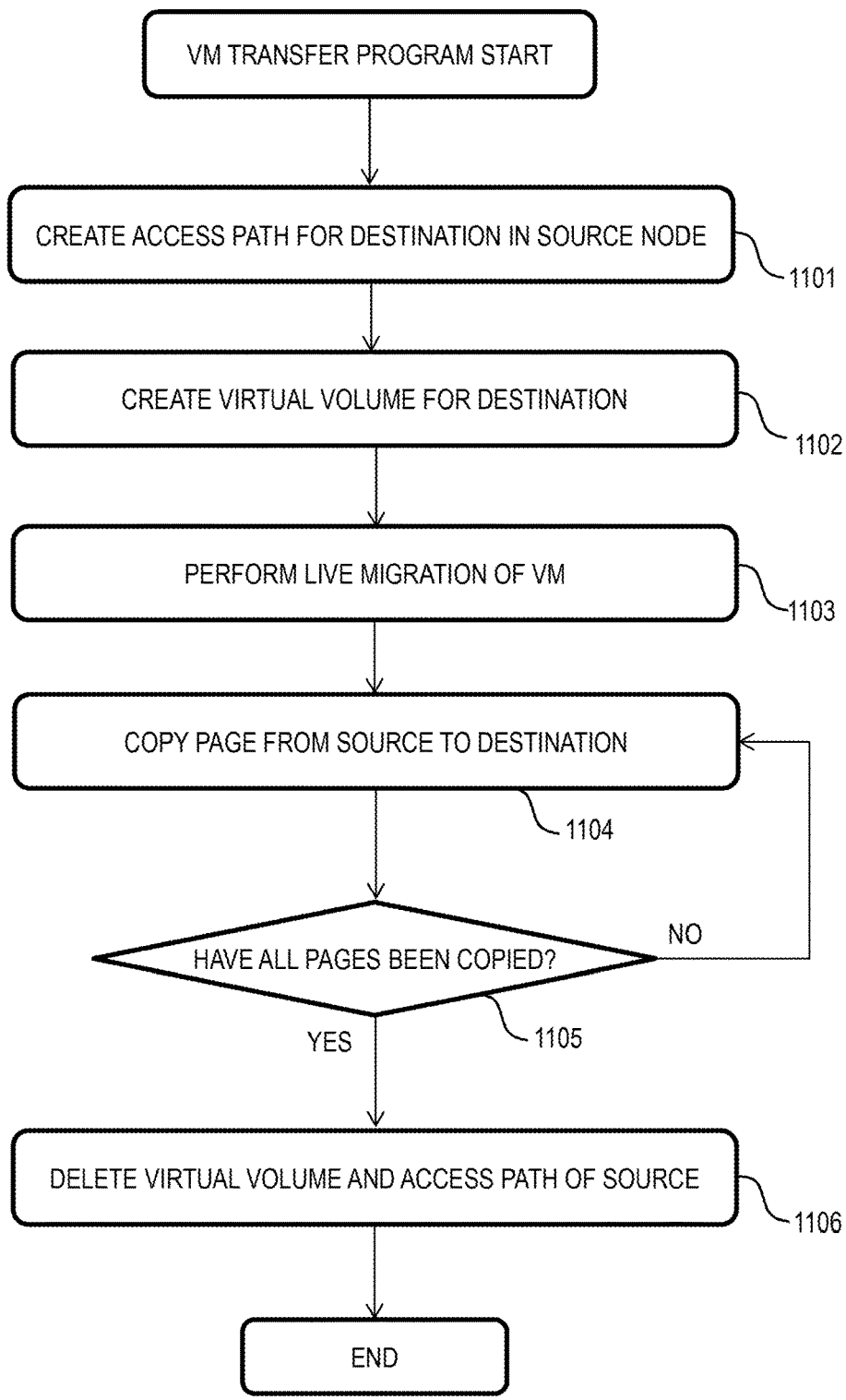
FIG. 10 shows a flowchart of the VM transfer program of the embodiment.

FIG. 10 shows a flowchart of the VM transfer program 413 of this embodiment. In this process, the live migration and the transfer of VM image data for the VM 201 are simultaneously conducted. In this way, the VM 201 is transferred while maintaining the local reading by the VM 201. The local reading is data reading from the local storage that does not use a network.

The VM transfer program 413 of the destination computer node 101 creates an access path from the source to the destination (Step 1101). For example, the VM transfer program 413 performs a log-in process so that the VM 201 of the destination computer node 101 can access the volume of the source.

Next, the VM transfer program 413 creates a virtual volume in the destination (Step 1102). It is preferable that the VM transfer program 413 create the volume in the same size as that of the source. Next, the VM transfer program 413 performs the live migration of the VM 201 (Step 1103).

The VM transfer program 413 copies the pages from the source to the destination (Step 1104). For example, the VM transfer program 413 has a copy pointer (sequential pointer indicating the position from the start to end of a volume), and copies respective pages in the order of LBA. This copy pointer can be used to determine whether the pages have been copied or not in Step 602 or Step 709. If the pages are before the copy pointer, those pages have been copied, and if the pages are after the copy pointer, those pages have not been copied.

Next, the VM transfer program 413 determines whether all of the pages have been copied or not (Step 1105). For example, if the copy pointer has reached the end of the volume, the VM transfer program 413 determines that all the pages have been copied.

Lastly, the VM transfer program 413 erases the virtual volume in the source and the access path thereof (Step 1106). After the virtual volume is deleted, the page used by the virtual volume opens up as an unused page, which increases the available capacity. The data in the buffer used for the network I/O may also be opened up. As described above, the VM 201 can be transferred while continuing the storage I/O.

Figure 11:
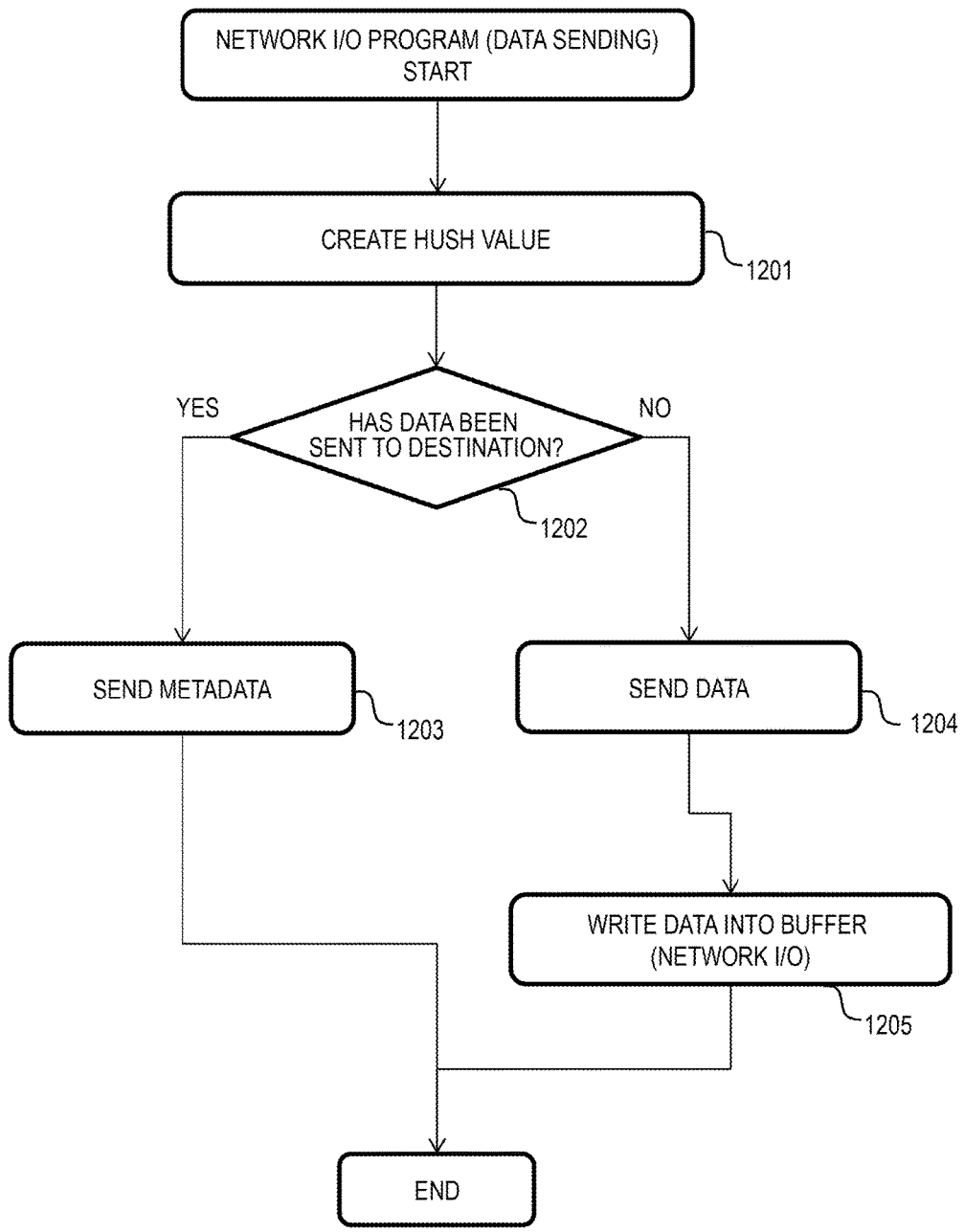
FIG. 11 shows a flowchart of the network I/O (sending) of the embodiment.

FIG. 11 shows a flowchart of the network I/O (sending) of this embodiment. This process is called upon by the hypervisor 203 when the respective application programs 202 of different computer nodes 101 communicate with each other. The network I/O program 414 checks the hush value of the transmission data to determine whether the data has been written in the storage drive 113 or the buffer 306.

If the same data as the target data has already been sent to the destination, the network I/O program 414 sends metadata only. If not, the network I/O program 414 sends mirror data together with metadata. This makes it possible to reduce the data transfer amount between respective computer nodes.

As shown in FIG. 11, the network I/O program 414 generates the hush value of the data to be sent (Step 1201). The network I/O program 414 checks if the same data has already been sent to the destination computer node 101.

For example, the network I/O program 414 refers to the page mapping table 305 to see if an entry of the hush value exists. If an entry of the hush value exists, and if the transfer information column 352 indicates that the data has not been sent to the destination, the network I/O program 414 sends the data to the destination (Step 1204), writes the data into the buffer 306 (Step 1205), and ends the process. The same is done when an entry of the hush value does not exists.

The network I/O program 414 updates the page mapping table 305. The network I/O program 414 may only update the hush value of the page mapping table 305 without writing the data into the buffer 306. The destination computer node 101 maintains the data in the buffer 306.

If the data has already been sent, the network I/O program 414 sends metadata only (Step 1203), and ends the process. The metadata includes a hush value, for example, so that the data can be found using the hush value in the destination.

Figure 12:
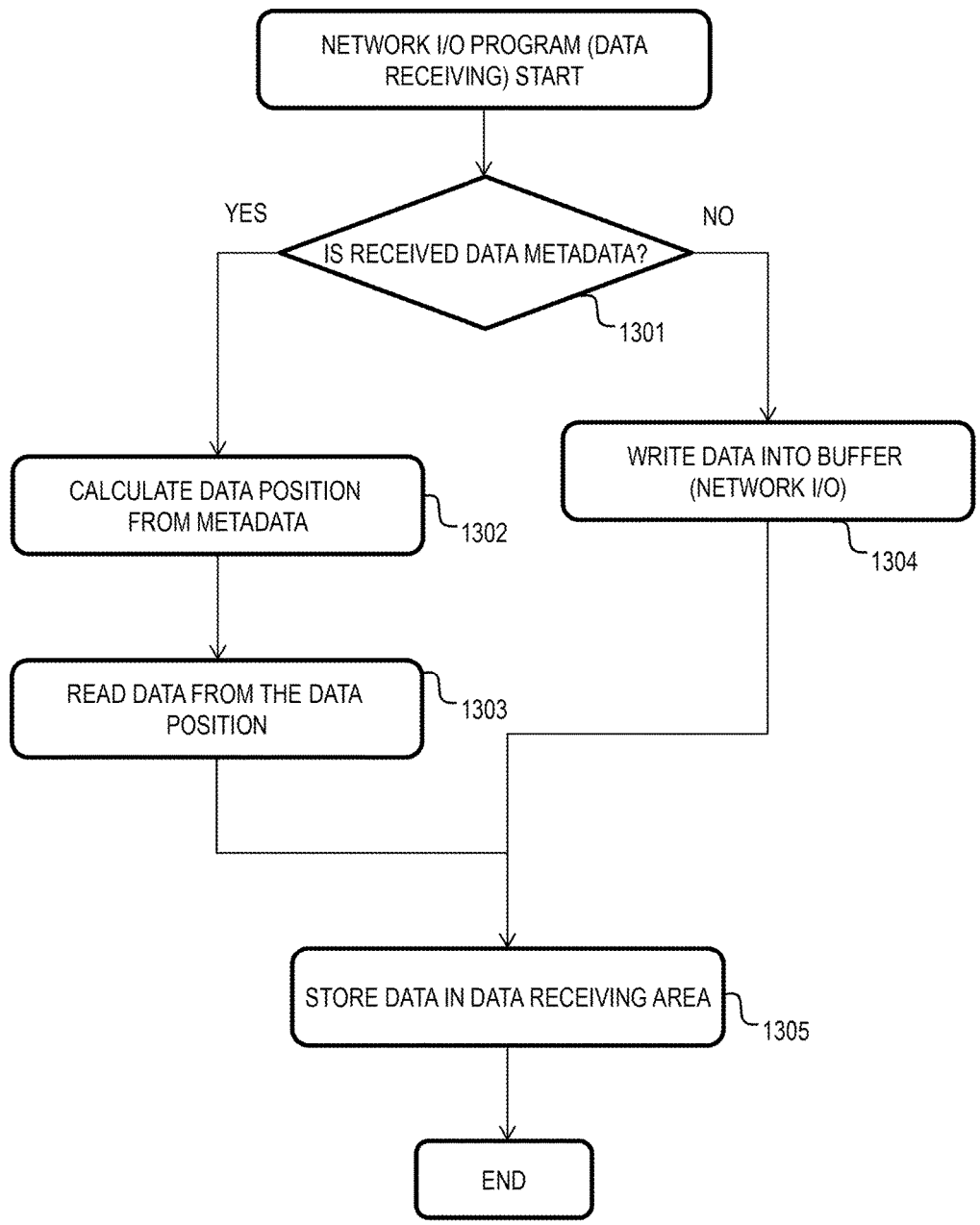
FIG. 12 shows a flowchart of the network I/O (receiving) of the embodiment.

FIG. 12 shows a flowchart of the network I/O (receiving) of this embodiment. First, the overview of this process will be explained. This process is called back by the hypervisor when respective applications of VMS 201 communicate with each other. By temporarily storing the received data of the network I/O rather than deleting it, it is possible to avoid transferring the same data again, which can reduce the overhead of data transfer.

As shown in FIG. 12, the network I/O program 414 determines whether the received data is metadata or data (Step 1301). If the received data is metadata, the network I/O program 414 refers to the page mapping table 305, calculates the data position based on the metadata (Step 1302), and reads out data based on the data position (buffer or drive) (Step 1303).

If the metadata is a hush value, by searching the page mapping table 305 for the hush value, the data position can be identified. If parity was generated, and the target data does not exist, the network I/O program 414 sends a query to the computer node 101 containing such data, or restores the data from the parity.

Thereafter, the network I/O program 414 stores the data in the receiving area of the application program 202 (Step 1305), and ends the process. If the received data is not metadata (the received data is data), the network I/O program 414 writes the data into the buffer 306 (Step 1304), and stores the data in the data receiving area (Step 1305). With this process, it is possible to reduce the network transfer amount in conjunction with the process of the transmission side described with reference to FIG. 11.

As described above, with this embodiment, it is possible to improve the process efficiency in a computer system (hyper-converged system) in which the storage, network, and computing are converged. The computer system obtains the information of the remaining writable space (life) of the local storage of the computer node, and changes the arrangement of VM depending on the write load amount of the VM.

By selecting the arrangement of the VM and image data depending on the write load amount and data size of the VM, the life consumption of the storage drive can be distributed, and the usage of capacity can also be distributed. As a result, it is possible to avoid the situation where a local storage of a particular computer node comes to the end of life or uses up all the capacity.

In this embodiment, an increase in data amount written into the local storage by a scalable application (NoSQL) that operates in the hyper-converged system can be reduced by the deduplication of data and erasure coding, and also, the storage capacity can be used more efficiently. In this embodiment, the capacity and the remaining writable space are managed by each computer node, which achieves higher scalability. According to this embodiment, even in a large-scale computer environment, it is possible to reduce the cost of medium while reducing the number of maintenance.

If the data has already been transferred, only the metadata thereof is transferred. This makes it possible to reduce the network transfer amount and storage consumption amount (write amount). By replacing the storage consumption (write amount) by the replication of the application with storage mirroring, the storage consumption (write amount) can be reduced.

In the writing process described in this embodiment, if the original data exists in the computer node or in another computer node, only the data reference may be revised instead of writing the actual data so that the processing efficiency is improved.

The larger the buffer amount is, the greater reduction can be made for the network transfer amount and the storage consumption amount (write amount) by the storage process or the application network process. It is also possible to assign the buffer to the storage area of the storage drive and actively optimize the buffer amount depending on the load (write amount).

It should be noted that this invention is not limited to the above-described embodiments but include various modifications. For example, the above-described embodiments have provided details for the sake of better understanding of this invention; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card. The drawings shows control lines and information lines as considered necessary for explanations but do not show all control lines or information lines in the products. It can be considered that most of all components are actually interconnected.

What is claimed is:

1. A computer system including a plurality of computer nodes communicating with each other via a network,
   wherein each of the plurality of computer nodes includes a local storage and at least one virtual machine,
   wherein each of the plurality of computer nodes transfers write data for the local storage to at least one different computer node for redundancy, and
   wherein a computer included in the computer system is configured to:
   obtain information indicating a write load amount of a first virtual machine;
   obtain information indicating remaining writable space of a local storage of a destination computer node among the plurality of computer nodes; and
   determine whether or not the first virtual machine should be transferred to the destination computer node, based on the write load amount of the first virtual machine and the remaining writable space of the destination computer node.

2. The computer system according to claim 1, wherein the computer is configured to determine whether or not the first virtual machine should be transferred to the destination computer node, based on an available capacity of the destination computer node and an image data size of the first virtual machine.

3. The computer system according to claim 1, wherein the computer determines whether or not the virtual machine should be transferred to the destination computer node, based on an increased amount of the write load amount of each of the at least one different computer node caused by data transfer for redundancy and remaining writable space of each of the at least one different computer node after the first virtual machine is transferred to the destination computer node.

4. The computer system according to claim 1, wherein the first virtual machine operates in a first computer node among the plurality of computer nodes,
   wherein said computer is the first computer node, and
   wherein the first computer node determines whether or not the first virtual machine should be transferred based on remaining writable space of the local storage of the first computer node and a write load amount of a virtual machine operated by the first computer node.

5. The computer system according to claim 1, wherein the plurality of computer nodes include a first computer node and a second computer node,
   wherein the first computer node is configured to:
   contain management information for managing data that has been transferred to the second computer node,
   refer to the management information and determine whether or not the same data as first data that needs to be transferred to the second computer node has already been transferred to the second computer node, and
   send only metadata of the first data to the second computer node if the first computer node has already transferred the same data.

6. The computer system according to claim 5, wherein the management information manages transfer data of data stored in a local storage of the first computer node, and data transferred between a virtual machine of the first computer node and a virtual machine of the second computer node.

7. The computer system according to claim 5, wherein the metadata indicates a hash value of the first data.

8. A method to control a computer system including a plurality of computer nodes that communicate with each other via a network,
   wherein each of the plurality of computer nodes includes a local storage and at least one virtual machine,
   wherein each of the plurality of computer nodes transfers write data for the local storage to at least one different computer node for redundancy, and
   wherein the method comprises:
   obtaining information indicating a write load amount of a first virtual machine;
   obtaining information indicating remaining writable space of a local storage of a destination computer node among the plurality of computer nodes; and
   determining whether or not the first virtual machine should be transferred to the destination computer node, based on the write load amount of the first virtual machine and the remaining writable space of the destination computer node.

9. The method according to claim 8 further comprising determining whether or not the first virtual machine should be transferred to the destination computer node, based on an available capacity of the destination computer node and an image data size of the first virtual machine.

10. The method according to claim 8 further comprising determining whether or not the virtual machine should be transferred to the at least one different computer node, based on an increased amount of the write load amount of the at least one different computer node caused by data transfer for redundancy and remaining writable space of the at least one different computer node after the first virtual machine is transferred to the destination computer node.

11. The method according to claim 8, wherein the first virtual machine operates in a first computer node among the plurality of computer nodes,
    wherein the method further comprises determining whether or not the first virtual machine should be transferred based on remaining writable space of a local storage of the first computer node and a write load amount of a virtual machine executed by the first computer node.

12. The method according to claim 8, wherein the plurality of computer nodes include a first computer node and a second computer node,
    wherein the method further comprises:
    referring to management information that manages data that has been transferred from the first computer node and the second computer node and determining whether or not the same data as first data that needs to be transferred to the second computer node has already been transferred to the second computer node; and
    sending only metadata of the first data to the second computer node if the first computer node has already transferred the same data.

13. The method according to claim 12, wherein the management information manages transfer data of data stored in the local storage of the first computer node, and data transferred between a virtual machine of the first computer node and a virtual machine of the second computer node.

14. The method according to claim 12, wherein the metadata indicates a hash value of the first data.

* * * * *